United States Patent [19]
Lutz et al.

[11] Patent Number: 4,601,941
[45] Date of Patent: Jul. 22, 1986

[54] HIGH HEAT METAL-POLYMER LAMINATE

[75] Inventors: Robert G. Lutz; William P. Gergen, both of Houston, Tex.

[73] Assignee: Shell Oil Company, Houston, Tex.

[21] Appl. No.: 648,099

[22] Filed: Sep. 7, 1984

[51] Int. Cl.⁴ .............................................. B32B 7/02
[52] U.S. Cl. .................. 428/213; 428/425.8; 428/458; 428/461; 428/463; 428/475.5; 428/474.4; 428/659; 428/681; 525/92; 525/98
[58] Field of Search .................. 525/92, 98; 428/461, 428/425.8, 463, 458, 681, 475.5, 474.4, 650, 216, 659, 213

[56] References Cited

U.S. PATENT DOCUMENTS

| | | | |
|---|---|---|---|
| 3,582,427 | 6/1971 | Baeskel | 156/283 |
| 4,111,895 | 9/1978 | Gergen | 260/42.18 |
| 4,204,022 | 5/1980 | Snyder et al. | 428/337 |
| 4,229,504 | 10/1980 | Brachman | 428/461 |
| 4,313,996 | 2/1982 | Newman et al. | 428/215 |
| 4,369,222 | 1/1983 | Hedrick et al. | 428/216 |
| 4,424,254 | 1/1984 | Hedrick et al. | 428/215 |
| 4,493,919 | 1/1985 | Durbin | 525/92 |

Primary Examiner—Edith Buffalow
Attorney, Agent, or Firm—Dean F. Vance

[57] ABSTRACT

A novel metal-polymer-metal structural laminate is disclosed having an unexpected balance of property advantages including light weight, good adhesion between polymer and metal, high stiffness and automotive paint bake oven stability. The high heat laminate has a polymeric resinous core comprising the blend of an engineering thermoplastic resin and a selectively hydrogenated monoalkenyl arene-conjugated diene block copolymer.

21 Claims, No Drawings

HIGH HEAT METAL-POLYMER LAMINATE

FIELD OF THE INVENTION

This invention relates to metal-polymer laminates and to their prepration. More particularly, this invention relates to novel metal-polymer-metal structural laminates having a unique combination of property advantages.

BACKGROUND OF THE INVENTION

Metal-plastic-metal laminates have been described in various U.S. and foreign patents. Exemplary patents include U.S. Pat. Nos. 3,582,427, 4,229,504, 4,204,022, 4,313,996, 4,369,222, 4,424,254 and EPA No. 19,835. These laminates are useful as light weight replacements for sheet steel in cars and trucks. Relatively thin laminates are useful in flexible packaging end use applications while relatively thick laminates are useful as constuction laminates.

Methods of preparing such laminates are also known. One method includes bringing at least one layer of plastic and at least one layer of metal into intimate contact and subjecting them to suitable heat and pressure, using, for example, a platen press. A more efficient and continuous method involves the well known extrusion processes—extrusion coating or extrusion lamination. Often an intermediate layer of adhesive or primer, in the form of a film or coating, is used in conjunction with these methods to insure adequate adhesion between the metal substrate and plastic.

In the past, one primary incentive for considering the replacement of sheet steel with metal-polymer laminates was the weight saving that could be obtained with equivalent stiffness. Placing thin steel skins on the outside of the laminate makes optimal use of high yield, high modulus steel and allows the structurally ineffective (in bending) middle portion of the composite to be light weight plastic, resulting in the primary advantage of steel-plastic laminates—weight reduction versus an equivalent stiffness sheet steel, but at substantially less cost penalty compared to other weight-reducing materials such as aluminum sheet. In other cases it has been desired to obtain sound or vibration damping from the laminate.

One of the basic limitations of many of the prior art metal-polymer laminates is the lack of sufficient high-temperature stability to enable the laminate to pass through current automotive bake ovens. A satisfactory high temperature laminate must not exhibit significant distortion at 205° C. Metal polymer laminates having cores of rigid engineering thermoplastics meet this requirement. Such metal-polymer laminates however tend to delaminate in conventional sheet metal forming processes due to the lack of ductility of the adhesion bond between polymer and metal. A new laminate has now been found that does possess adequate heat distortion characteristics and good ductility.

SUMMARY OF THE INVENTION

The present invention deals with a metal-polymer-metal structural laminate having an unexpected balance of properties including light weight, high stiffness, good adhesion between polymer and metal, and automotive paint bake oven stability. In particular, the present invention deals with a metal-polymer-metal structural laminate comprising a core of polymeric resinous material having tightly adhered to each side thereof a metal skin layer wherein:

(a) said metal skin layer is about 5 to about 40 mils thick;
(b) said laminate has a ratio of core thickness to skin thickness of between about 1:2 and about 20:1;
(c) said laminate total thickness is between about 15 mils and about 300 mils; and
(d) said polymeric resinous material comprises the admixture obtained by intimately mixing about 4 to about 96 parts by weight of a block copolymer and about 96 to about 4 parts by weight of an engineering thermoplastic resin so as to form at least partial continuous interlocking networks wherein:
  (i) said block copolymer comprises at least two monoalkenyl arene polymer end blocks A and at least one substantially completely hydrogenated conjugated diene mid block B, said block copolymer having an 8 to 55 percent by weight monoalkenyl arene polymer block content, each polymer block A having an average molecular weight of between about 5,000 and about 125,000, and each polymer block B having an average molecular weight of between about 10,000 and about 300,000; and
  (ii) said engineering thermoplastic resin has a generally crystalline or amorphous structure and a crystalline melting point or glass transition point over about 120° C.

As used herein, the term "tightly adhered" means a lap shear value of at least about 300 psi at room temperature as measured by ASTM D 3165-73 using a lap length of about 0.25 inch.

The laminates of the present invention have a unique combination of property advantages. These laminates have demonstrated the primary advantage, weight reduction versus an equivalence stiffness sheet steel while in addition demonstrating high temperature stability and good forming capability. As shown in the embodiments which follow, laminates according to the present invention have excellent high heat distortion temperature along with good adhesion between polymer and metal skins. As a result of these property advantages, parts made from such laminates will not distort during normal paint bake oven operations nor delaminate during forming operations.

An important attribute of these laminates is their stiffness relative to steel. It is possible to obtain equivalent stiffness to steel with only about a 5 to 10 percent increase in overall thickness. This means that it is possible to employ existing stamping dies to stamp parts. In addition, the small increase in thickness results in a large decrease in weight.

DETAILED DESCRIPTION OF THE INVENTION

The metal skin layers which are used in accordance with this invention each have a thickness of about 5 to about 40 mils (thousands of an inch), preferably about 8 to about 20 mils. The metal skin layer can be formed, for example, from aluminum, aluminum alloys, alloy-clad aluminum, surface modified copper, bronze, magnesium or magnesium alloys, steel, tin-free steel, tin-plate steel, aluminized steel, stainless steel, surface modified copper-clad stainless steel, terneplate steel, galvanized steel, chrome or chrome treated steel, zinc coated steel and the like. These metals may also be surface treated or have thereon surface conversion coatings. A preferred group of metals is steel and steel alloys. Steel alloys include the chrome/chrome oxide coated steel substrate or so-called tin-free steel (TFS) described in Canadian Pat. No. 808,630 and U.S. Pat. Nos. 3,526,486 and 3,826,628, the teachings of which are hereby incorporated by reference, and zinc coated alloys. The thickness of discrete layers of chromium metal and chromium oxide may be controlled by varying plating bath parameters as is well known in the art. The metal skin of most preference is regular cold rolled steel, also termed black plate.

The metal skin layers on each side of the core can be formed of the same metal or of different metals and can have same or different thicknesses.

The high temperature stability and superior forming characteristics of the present invention result from the particular resinous polymeric material employed as the core herein. The resinous polymer material employed herein is the admixture obtained by intimately mixing about 4 to about 96 parts by weight of a certain block copolymer and about 96 to about 4 parts by weight of an engineering thermoplastic so as to form at least partial continuous interlocking networks.

The block copolymer of the instant invention effectively acts as a mechanical or structural stabilizer which interlocks the polymer structure networks and prevents the consequent separation of the polymers during processing and their subsequent use. As defined more fully hereinafter, the resulting structure of the instant polyblend is that of two at least partial continuous interlocking networks. This interlocked structure results in a dimensionally stable polyblend that will not delaminate upon extrusion and subsequent use. Because of the co-continuous nature of the mixture, the resulting blend combines the high temperature stability of the ETP and the ductility of the elastomeric block copolymer.

To produce stable blends it is necessary that both polymers have at least partial continuous networks which interlock with each other. In an ideal situation both polymers would have complete continuous networks which interlock with each other. A partial continuous network means that a portion of the polymer has a continuous network phase while the other portion has a disperse phase structure. Preferably, a major proportion (greater than 50% by weight) of the partial continuous network is continuous.

The block copolymers employed in the present invention may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer mid block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with multifunctional coupling agents such as dihaloalkanes or -alkenes and divinyl benzene as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene (SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methylstyrene).

It will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term "monoalkenyl arene" will be taken to include especially styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles, a regular copolymer block of ethylene and butene-1 (EB). If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000–125,000, preferably 7,000–60,000 while the conjugated diene blocks either before or after hydrogenation will have average molecular weights in the order of 10,000–300,000, preferably 30,000–150,000. The total average molecular weight of the block copolymer is typically in the order of 25,000 to about 350,000, preferably from about 35,000 to about 300,000. These molecular weights are most accurately determined by tritium counting methods or osmotic pressure measurements.

The proportion of the monoalkenyl arene blocks should be between about 8 and 55% by weight of the block copolymer, preferably between about 10 and 30% by weight.

While the average molecular weight of the individual blocks is not critical, at least within the above specified limits, it can be important to select the type and total molecular weight of the block copolymer necessary to get the interlocking network under the chosen blending conditions. As discussed more fully hereinafter, interlocking structure can be obtained when the viscosity of the block copolymer and the engineering thermoplastic resin are substantially the same at the temperature used for blending and processing. In some instances, matching of the viscosity of the block copolymer portion and the resin portion are best achieved by using two or more block copolymers or resins. For example, a blend of two block copolymers having different molecular weights or a blend of a hydrogenated SBS and hydrogenated SIS polymers may be employed.

Matching of the viscosity of the block copolymer portion and the engineering thermoplastic resin portion may also be accomplished by adding supplemental blending components such as hydrocarbon oils and other resins. These supplementary components may be blended with the block copolymer portion or the engineering thermoplastic resin portion, but it is preferred to add the additional components to the block copolymer portion. This pre-blended block copolymer composition is then intimately mixed with the engineering thermoplastic resin to form compositions according to the present invention.

The types of oils useful in the practice of this invention are those polymer extending oils ordinarily used in the processing of rubber and plastics, e.g., rubber compounding oils. Especially preferred are the types of oil that are compatible with the elastomeric segment of the block copolymer. While oils of higher aromatics content are satisfactory, those petroleum-based white oils having low volatility and less than 50% aromatics content as determined by the clay gel method of tentative ASTM method D 2007 are particularly preferred. The oils should additionally have low volatility, preferably having an initial boiling point above 500° F. The amount of oil employed varies from about 0 to about 100 phr (parts by weight per hundred parts by weight rubber, or block copolymer as in this case), preferably about 5 to about 30 phr.

The other component in the admixture used for the resinous core is an engineering thermoplastic resin. The label engineering thermoplastic resin has come to be applied to those polymers that possess a property balance comprising strength, stiffness, impact, and long term dimensional stability. Preferably these engineering thermoplastic resins have glass transition temperatures or apparent crystalline melting points (defined as that temperature at which the modulus, at low stress, shows a catastrophic drop) of over about 120° C., more preferably between about 150° C. and about 350° C., and are capable of forming a continuous network structure through a thermally reversible crosslinking mechanism. Such thermally reversible crosslinking mechanisms include crystallites, polar aggregations, ionic aggregations, lamellae, or hydrogen bonding. In a specific embodiment, where the viscosity of the block copolymer or blended block copolymer composition at processing temperature $T_p$ and a shear rate of 100 sec$^{-1}$ is $\eta$, the ratio of the viscosity of the engineering thermoplastic resins, or blend of engineering thermoplastic resin with viscosity modifiers to $\eta$ should be between about 0.2 and about 4.0, preferably about 0.8 and about 1.2. As used in the specification and claims, the viscosity of the block copolymer and the thermoplastic engineering resin is the "melt viscosity" obtained by employing a piston driven capillary melt rheometer at constant shear rate and at some consistent temperature above melting, say 260° C. The upper limit (350° C.) on apparent crystalline melting point or glass transition temperature is set so that the resin may be processed in low to medium shear rate equipment at commercial temperature levels of 350° C. or less. The engineering thermoplastic resin also includes blends of various engineering thermoplastic resins and blends with fillers and the like.

By way of specific example, the various polymers found in the classes listed in Table A below and thereafter defined are within the definition of engineering thermoplastic resins:

TABLE A

1. Nitrile barrier resins
2. Thermoplastic polyesters
3. Poly(aryl ethers) and Poly(aryl sulfones)
4. Polyamides
5. Acetal resins
6. Thermoplastic polyurethanes
7. Halogenated thermoplastics These various engineering thermoplastic resins are further defined in U.S. Pat. No. 4,111,895, which is herein incorporated by reference. Other patents dealing with blends of the subject block copolymer and engineering thermoplastic resins are shown in Table B below:

TABLE B

U.S. Pat. No. 4,041,103
U.S. Pat. No. 4,079,099
U.S. Pat. No. 4,079,100
U.S. Pat. No. 4,080,403
U.S. Pat. No. 4,088,711
U.S. Pat. No. 4,096,204
U.S. Pat. No. 4,101,605
U.S. Pat. No. 4,080,356
U.S. Pat. No. 4,080,357
U.S. Pat. No. 4,081,424
U.S. Pat. No. 4,085,163
U.S. Pat. No. 4,088,626
U.S. Pat. No. 4,088,627
U.S. Pat. No. 4,090,996
U.S. Pat. No. 4,102,854
U.S. Pat. No. 4,107,130
U.S. Pat. No. 4,107,131
U.S. Pat. No. 4,110,303
U.S. Pat. No. 4,111,894
U.S. Pat. No. 4,111,896
U.S. Pat. No. 4,119,607
U.S. Pat. No. 4,126,600
U.S. Pat. No. 4,242,470

In the present invention the various polymers are blended in such a way as to form co-continuous interlocking networks; i.e., where a continuous phase of one polymer would be thought of as filling the voids of a continuous phase of the second polymer. The interlocking structure of the various polymers does not show gross phase separation such as would lead to delamination. Further, the blend is not so intimately mixed that there is molecular mixing or miscibility, nor one in which the separate phases will lead to delamination.

Without wishing to be bound to any particular theory, it is considered that there are two general requirements for the formation of an interlocking network. First, there must be a primary phase network stable to the shearing field. This requirement is fulfilled by employing the block copolymers of the instant invention having the capability of self-crosslinking (network formation) and furthermore having sufficiently high molecular weight to retain its network (domain) structure in processing. Second, the other polymers employed must be capable of some kind of chemical or physical crosslinks or other intermolecular association to maintain a continuous phase in the blend. The polymer must possess sufficient fluidity to interlock with the primary network in the blending process. This second requirement is met by the instant thermoplastic engineering resins.

There are at least two methods (other than the absence of delamination) by which the presence of an interlocking network can be shown. In one method, an interlocking network is shown when molded or extruded objects made from the blends of this invention are placed in a refluxing solvent that quantitatively dissolves away the block copolymer and other soluble components, and the remaining polymer structure (comprising the thermoplastic engineering resin) still has the shape and continuity of the molded or extruded object and is intact structurally without any crumbling or delamination, and the refluxing solvent carries no insoluble particulate matter. If these criteria are fulfilled, then both the unextracted and extracted phases are interlocking and continuous. The unextracted phase must be continuous because it is geometrically and mechanically intact. The extracted phase must have been continuous before extraction, since quantitative extraction of a dispersed phase from an insoluble matrix is highly unlikely. Finally, interlocking networks must be present in order to have simultaneous continuous phases. Also, confirmation of the continuity of the unextracted phase may be confirmed by microscopic examination.

In the second method, a mechanical property such as tensile modulus is measured and compared with that expected from an assumed system where each continuous isotropically distributed phase contributes a fraction of the mechanical response, proportional to its compositional fraction by volume. Correspondence of the two values indicates presence of the interlocking network, whereas, if the interlocking network is not present, the measured value is different than that of the predicted value.

An important aspect of the present invention is that the relative proportions of the various polymers in the blend can be varied over a wide range. The relative proportions of the polymers are presented below in parts by weight (the total blend comprising 100 parts):

|  | Preferred | More Preferred |
| --- | --- | --- |
| Engineering Thermoplastic | 96 to 4 | 93 to 7 |
| Block Copolymer | 4 to 96 | 7 to 93 |

Accordingly, it is possible to prepare a wide variety of polymer blends ranging from a flexibilized engineering thermoplastic to a stiffened elastomeric block copolymer. Note that the minimum amount of block copolymer necessary to achieve these blends may vary with the particular engineering thermoplastic.

The blending of the engineering thermoplastic resin and the block copolymer may be done in any manner that produces a blend which will not delaminate on processing, i.e., in any manner that produces the interlocking network. For example, the resin and block copolymer may be dissolved in a solvent common for all and coagulated by admixing in a solvent in which none of the polymers are soluble. But more preferably, a particularly useful procedure is to intimately mix the polymers in the form of granules and/or powder in a high shear mixer. "Intimately mixing" means to mix the polymers with sufficient mechanical shear and thermal energy to ensure that interlocking of the various networks is achieved. Intimate mixing is typically achieved by employing high shear extrusion compounding machines such as twin screw compounding extruders and thermoplastic extruders having at least a 20:1 L/D ratio and a compression ratio of 3 or 4:1.

The mixing or processing temperature (Tp) is selected in accordance with the particular polymers to be blended. For example, when melt blending the polymers instead of solution blending, it will be necessary to select a processing temperature above the melting point of the highest melting point polymer. In addition, as explained more fully hereinafter, the processing temperature may also be chosen so as to permit the isoviscous mixing of the polymers. Typically, the mixing or processing temperature is between about 150° C. and about 400° C. For blends containing poly(butylene terephthalate) Tp is preferably between about 230° C. and about 300° C.

Another parameter that can be important in melt blending to ensure the formation of interlocking networks is matching the viscosities of the block copolymer and the engineering thermoplastic resin (isoviscous mixing) at the temperature and shear stress of the mixing process. The better the interdispersion of the engineering resin in the block copolymer network, the better the chance for formation of co-continuous interlocking networks on subsequent cooling. Therefore, it has been found that when the block copolymer has a viscosity $\eta$ poise at temperature Tp and shear rate of 100 sec$^{-1}$, it is much preferred that the viscosity of the engineering thermoplastic resin or blend containing such resin have a viscosity at temperature Tp and a shear rate of 100 sec$^{1-}$ such that the ratio of the viscosity of the block copolymer over the viscosity of the engineering thermoplastic be between about 0.2 and about 4.0, preferably between about 0.8 and about 1.2. Accordingly, as used herein, isoviscous mixing means that the viscosity of the block copolymer divided by the viscosity of the other polymer or polymer blend at the temperature Tp is between about 0.2 and about 4.0. It should also be noted that within an extruder, there is a wide distribution of shear rates. Therefore, isoviscous mixing can occur even though the viscosity curves of two polymers differ at some of the shear rates.

The block copolymer or block copolymer blend may be selected to essentially match the viscosity of the engineering resin. Optionally, the block copolymer may be mixed with a rubber compounding oil or supplemental resin as described hereinbefore to change the viscosity characteristics of the block copolymer.

The particular physical properties of the instant block copolymers are important in forming co-continuous interlocking networks. Specifically, the most preferred block copolymers of the instant invention when unblended do not melt in the ordinary sense with increasing temperature, since the viscosity of these polymers is highly non-Newtonian and tends to increase without limit as zero shear stress is approached. Further, the viscosity of these block copolyemrs is also relatively insensitive to temperature. This rheological behavior and inherent thermal stability of the block copolymer enhances its ability to retain its network (domain) structure in the melt so that when the various blends are made, interlocking and continuous networks are formed.

The viscosity behavior of the instant thermoplastic engineering resin, on the other hand, typically is more sensitive to temperature than that of the instant block copolymers. Accordingly, it is often possible to select a processing temperature Tp at which the viscosities of the block copolymer and engineering resin fall within the required range necessary to form interlocking networks.

The polymer blends of the instant invention may be compounded further with other polymers, oils, fillers, reinforcements, antioxidants, stabilizers, fire retardants, antiblocking agents and other rubber and plastic compounding ingredients without departing from the scope of this invention.

Examples of various fillers that can be employed are in the 1971–72 Modern Plastics Encyclopedia, pages 240–247. Reinforcements are also very useful in the present polymer blends. A reinforcement may be defined simply as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Especially preferred are reinforced polymer blends of the instant invention containing about 2 to about 80 percent by weight glass fibers, based on the total weight of the resulting reinforced blend. It is particularly desired that coupling agents, such as various silanes, be employed in the preparation of the reinforced blends.

The polymeric resinous materials of the core can be bonded directly to the metal skin layers or by the use of an intermediate adhesive layer therebetween. One of the advantages of the present invention is that no adhesive layer is needed. If used, the intermediate adhesive layer can have a thickness from about 0.1 to 5 mils, preferably from about 0.3 to 3.0 mils. Such layer may be formed from any thermoplastic polymeric resinous material which will tightly adhere the core layer to the metalskin layers. A particularly preferred adhesive layer is a normally solid thermoplastic propylene-based polymer modified by monomers having reactive carboxylic acid groups, particularly a copolymer of a major proportion of propylene and a minor proportion, typically from 1 to 30, preferably from 2 to 20 percent by weight of an ethylenically unsaturated carboxylic acid. Specific examples of such suitable ethylenically unsaturated carboxylic acids (which term includes mono- and polybasic acids, acid anhydrides, and partial esters of polybasic acids) are acrylic acid, methacrylic acid, crotonic acid, fumaric acid, maleic acid, itaconic acid, maleric anhydride monomethyl malcate, monoethyl malcate, monomethyl fumarate, monoethyl fumarate, tripropylene glycol monomethyl ether acid maleate, or ethylene glycol monophenyl ether acid maleate. The carboxylic acid monomer is preferably selected from a $\beta$-ethylenically unsaturated mono- and polycarboxylic acids and acid anhydrides having from 3 to 8 carbon atoms per molecule and partial esters of such polycarboxylic acid wherein the acid moiety has at least one carboxylic acid group and the alcohol moiety has from 1 to 20 carbon atoms. The copolymer can also contain other copolymerizable monomers including an ester of acrylic acid. The comonomers can be combined in the copolymer in any way, e.g., as random copolymers, as block or sequential copolymers, or as graft copolymers. Materials of these kinds and methods of making them are readily known in the art. Specific examples of such copolymers are propylene acrylic acid copolymer, propylene methacrylic acid copolymer, propylene maleic acid copolymer and the like.

The adhesive layer can first be applied to the metal skin layers, first be applied to the core, or can be applied to the metal skin layer and the core simultaneously. The adhesive layer can be applied using well known application techniques, such as, for example, solvent casting, roll coating, or, preferably, extrusion processes and the like. When the adhesive layer is to be combined with the core prior to the lamination thereof to the metal skins, such layers can advantageously be introduced into the laminates by the well known coextrusion process or combining the conventional extrusion process with a film lamination technique.

In one embodiment of this invention, a metal-polymer-metal laminate is produced by disposing a layer of polymer resinous material, which layer is continuously extruded from a conventional, screw-type extruder between two metallic skin layers which are fed continuously to a nip formed by a pair of opposing and counter-rotating laminating rolls. Heat and pressure sufficient to affect a bond between the metal skin layers and the polymeric resinous material are applied to the skin layers. This is accomplished by heating one or both of the laminating rolls, by preheating metal skin layers, or through the heat of extrusion of the polymeric resinous material or combination of such heating steps. The distance between the laminating rolls at the nip can be controlled to exert effective pressure to metal-polymer-metal laminate to ensure adequate bond between the metal skins and the polymer core. The laminating rolls can be covered with a layer of polytetrafluorethylene to prevent sticking of polymeric resinous material to the rolls.

In another embodiment of this invention, the metal skin layers are first coated with an adhesive layer on one side thereof and are fed continuously to the combining nip with the coated sides facing toward each other. A layer of polymeric resinous material is disposed between the two adhesive coated skin layers by continuous extrusion as described hereinabove.

In yet another embodiment of this invention, a multi-layered extrudate comprising an adhesive layer—a core layer—an adhesive layer is disposed continuously and simultaneously between the two metal skin layers or precoated metal skin layers by the well known coextrusion process.

The present invention is not limited by the process used to prepare the metal-polymer-metal structural laminates. Extrusion processes, i.e., extrusion coating or extrusion lamination, film lamination techniques, solution coating techniques or combination of such techniques well known in the art can readily be used to produce the laminates of this invention. It is essential, however, that the thermoplastic polymeric resinous material of the adhesive layer and core layer be subjected to a temperature at least equal to the softening point thereof, for a period of time sufficient to cause the polymer to tightly adhere but not undergo significant degradation thereof, and effective pressure to achieve intimate contact between the polymer layers and the metal skin layers.

An important consideration in obtaining light weight laminates is the ratio of core thickness to skin thickness. The ratio of core thickness to skin thickness should be between 1:2 and 20:1, preferably between 1:2 and 3:1. These ratios include the thickness of any adhesive layer. The skin thickness includes both skins. The total laminate thickness should be between 15 mils and 300 mils, preferably between 25 mils and 60 mils.

To illustrate the present invention, the following illustrative embodiments are given. It is to be understood, however, that the embodiments are given for the purpose of illustration only and the invention is not to be regarded as limited to any of the specific materials or conditions used in the specific embodiments.

ILLUSTRATIVE EMBODIMENT #1

In Illustrative Embodiment #1, a steel/polymer/steel laminate was prepared and tested. The steel was electro-chrome coated steel (ECCS) having a thickness of about 10 mils, and was degreased in trichloroethane. The polymer core was a binary blend of polybutylene terephthalate (PBT) and a Kraton ® G block copolymer (G) in a weight ratio of 75:25 PBT to G.

The core was extruded into a film of about 15 mils thickness and the surface treated with a 20% NaOH solution at 180°–200° F. for 5 minutes. The laminate was then prepared by pressing the polymer film between 2 pieces of steel at an elevated temperature above the melting point of the polymer core.

Various tests were performed on the laminates. In the heat sag test, the sample was placed between two supports in a oven and the deflection in inches at various temperatures was noted. Adhesion was measured by lap shear (ASTM D3165-73) and by T-peel (ASTM D903). Corrosion was measured by standard metal tests (hot water fog and salt spray). The results, presented below in Table I, show excellent heat distortion and metal/polymer adherence properties:

TABLE I

| Heat Sag Test | |
|---|---|
| Temp., °F. | Deflection, in. |
| 350 | 0 |
| 375 | 0 |
| 400 | 0 |
| 425 | 0.15 |

| Adhesion | |
|---|---|
| T-peel | 24 pli* @ 0.5 in/min crosshead speed |
|  | 32 pli* @ 10 in/min crosshead speed |
| Lap shear | 2300 psi* |

| Corrosion | |
|---|---|
| 1000 hrs water fog (~100° F.) | no undercutting of scribed lines adhesion was qualitatively reduced |
| 1000 hrs salt spray (~90° F.) | no undercutting of scribed line |

*Failure: cohesive near bond line

While metal laminates of the same dimensions having cores of 100% PBT have equal heat deflection characteristics, they have no measurable T-Peel value. This results from the rigidity of the PBT which concentrates the stress applied in the T-Peel test and causes catastrophic failure of the adhesive bond. The laminates of this embodiment are difficult to separate and have high measure values of T-Peel.

ILLUSTRATIVE EMBODIMENT II

In Illustrative Embodiment II, a steel/polymer/steel laminate was prepared in a platen press according to the present invention. The steel skins were 9.5 mil black plate. The core was a PBT/Kraton G polymer binary blend (70% PBT/30% K-G). A film of polymer core was extruded and cut into large sheets (about 3'×8'). These sheets were placed between two steel sheets and then pressed together in a platen press. The temperature was raised to 425°–450° F. (core temperature) and held there for about 5 minutes at about 500 psi pressure.

The results, presented in Tables IIa and IIb, also show excellent heat distortion and forming characteristics:

TABLE IIa

| Evaluation Item | Unit | Evaluating Method | Sample HH 0283 | |
|---|---|---|---|---|
| Total thickness | mm | Actual measurement of sample | 0.803 | +0.078 −0.063 |
| Thickness of surfacing material | " | " | 0.235 | |
| Weight | kg/m² | " | 4.149 | |
| Peel strength | | ASTM D903 10 × 100 mm | | |
| Initial strength | | | | |
| 23° C. | kg/cm (pli) | Measurement carried out in | 6.0 | (33.6) |
| 80° C. | " | the air bath | 6.0 | (33.6) |
| 120° C. | " | | 6.1 | (34.1) |
| 150° C. | " | | 5.4 | (30.2) |
| Air bath | | | | |
| 80° C. × 300 hrs | kg/cm (pli) | Measurement carried out at | 6.0 | (33.6) |
| 120° C. × 300 hrs | " | 23° C. after heating the | 7.0 | (39.2) |
| 150° C. × 100 hrs | " | sample in the air bath | 10.3 | (57.6) |
| 150° C. × 300 hrs | " | | 6.3 | (35.2) |
| 150° C. × 600 hrs | " | | 2.7 | (15.1) |
| 150° C. × 900 hrs | " | | 0 | (0) |
| Deflection temperature (Under shear stress) | °C. | Shearing area 10 W × 25 L mm Load 12 g | 232 | |

TABLE IIb

| Evaluation Item | Unit | Evaluating Method | Sample HH 0283 |
|---|---|---|---|
| Tensile test | | Parallel part of the dumb-bell shaped test sample: 15 mm wide (W) and 50 mm long (L) | |
| Yield strength | kg/mm$^2$ | Offset = 0.2% | 16.2 |
| Tensile strength | " | | 21.9 |
| Elongation | % | | 40.0 |
| Bending test | | ASTM D790 12.5 W × 32 L mm | |
| Modulus of elasticity | kg/mm$^2$ | span 16 mm | 7,014 |
| Yield strength | " | Offset = 0.2% | 28.5 |
| Bulging test Erichsen value | mm | 10-mm-radius punch | 8.07 |
| Bend forming test | — | 100 W × 50 L mm 5-mm-radius punch, 90° bending | Workable |
| Vibration damping properties | | Decay method (at resonance frequency) Size: 30 W × 300 L mm (2-node-hanging) | |
| Resonance frequency | Hz | 1st mode | 56 |
| 1st Loss factor ($\eta$) | × 10$^{-4}$ | | 13 |
| Resonance frequency | Hz | 2nd mode | 154 |
| 2nd Loss factor ($\eta$) | × 10$^{-4}$ | | 6 |
| Resonance frequency | Hz | 3rd mode | 301 |
| 3rd Loss factor ($\eta$) | × 10$^{-4}$ | | 6 |
| Resonance frequency | Hz | 4th mode | 494 |
| 4th Loss factor ($\eta$) | × 10$^{-4}$ | | 7 |

ILLUSTRATIVE EMBODIMENT III

In Illustrative Embodiment III, four different core materials were employed in metal/polymer/metal laminates. The steel skins were nominal 9.5 mil black plate steel. The surface of the steel was sanded (lightly) to remove surface contaminates, then washed with solvent prior to making the laminates. The various polymer core compositions were:

| Core # | Composition |
|---|---|
| A* | 100% Nylon 6-6 (DuPont Zytel 101) |
| B** | Blend of 70% w Nylon 6-6 and 30% w Kraton ® G 1651 block copolymer |
| C* | 100% PBT (General Electric Valox 310) |
| D** | Blend of 70% w PBT and 30% w Kraton G 1651 block copolymer |

*for comparison
**according to the present invention

Compression molded films of about 20 mil were prepared for each different core. The polymer cores were placed between steel skin and laminates were prepared under identical conditions:
 2 min. warm up @450° F.
 2 min. under 20 tons pressure
 2 min. cool under 5 tons
The laminates were dried at 200° F. for three days, and then submitted for lap shear testing according to ASTM D3165-73. The results are presented below in Table III (three or four laminates for each different core):

TABLE III

| Sample # | R.T. LAP SHEAR @ .05"/min Width | Length | Chart 5"/min Lap Area | Break Load (psi) |
|---|---|---|---|---|
| A -1 | .999 | .980 | .979 | 757 |
| -2 | 1.069 | .991 | 1.059 | 803 |
| -3 | 1.010 | .992 | 1.002 | 524 |
| -4 | 1.024 | .971 | .994 | 822 |
| | | | MEAN (psi) | 727 |
| B -1 | 1.033 | .986 | 1.019 | 465 |
| -2 | 1.015 | .989 | 1.004 | 460 |
| -3 | 1.006 | .988 | .994 | 204 |
| | | | MEAN (psi) | 376 |
| C -1 | .931 | 1.007 | — | >648* |
| -2 | 1.004 | .997 | — | >800* |
| -3 | .960 | .990 | — | >778* |
| D -1 | 1.003 | .979 | — | >794* |
| -2 | 1.005 | .997 | — | >762* |
| -3 | .994 | .994 | — | >804* |

*Metal broke, not plastic

The results above show that nylon (A) and block copolymer-nylon blends (B) both have acceptable lap shear strength. For either PBT (C) or block copolymer-PBT blends (D), the lap shear bond exceeds the strength of the metal skins. The metal failed at about 750-800 psi, while the MPL bond remained intact. These data clearly suggest that PBT is the better choice between these engineering thermoplastics. It must be kept in mind that while neat Nylon or neat PBT form tenacious bonds, they cannot be used as neat polymers because of brittle behavior in forming. Blends with the particular block copolymer according to the present invention overcome this problem.

What is claimed is:

1. A metal-polymer-metal structural laminate having an unexpected property balance of high stiffness, good adhesion between polymer and metal, and automotive paint bake oven stability, said laminate comprising a core of polymeric resinous material having tightly adhered to each side thereof a metal skin layer wherein:
 (a) said metal skin layer is about 5 to about 40 mils thick;

(b) said laminate has a ratio of core thickness to skin thickness of between about 1:2 and about 20:1;

(c) said laminate total thickness is between about 15 mils and about 300 mils; and (d) said polymeric resinous material comprises the admixture obtained by intimately mixing about 4 to about 96 parts by weight of an elastomeric block copolymer and about 96 to about 4 parts by weight of an engineering thermoplastic resin so as to form at least partial continuous interlocking networks wherein (i) said block copolymer comprises at least two monoalkenyl arene polymer end blocks A and at least one substantially completely hydrogenated conjugated diene mid block B, said block copolymer having an 8 to 55 percent by weight monoalkenyl arene polymer block content, each polymer block A having an average molecular weight of between about 5,000 and about 125,000, and each polymer block B having an average molecular weight of between about 10,000 and about 300,000; and (ii) said engineering thermoplastic resin has a generally crystalline or amorphous structure and a crystalline melting point or glass transition point over about 120° C.

2. The structural laminate of claim 1 wherein the metal skin layers on each side of the core are different thicknesses.

3. The structural laminate of claim 1 wherein the metal skin layers on each side of the core are of different metals.

4. The laminate of claim 1 wherein the ratio of core thickness to skin thickness is between 1:2 and 3:1.

5. The laminate of claim 1 wherein the total laminate thickness is between 25 mils and 60 mils.

6. The laminate of claim 1 wherein the core incorporates a solid filler.

7. The structural laminate of claim 1 wherein the metal skin is steel.

8. The structural laminate of claim 1 wherein the metal skin is aluminum.

9. The structural laminate of claim 1 wherein said engineering thermoplastic resin is selected from the group consisting of thermoplastic polyesters, poly(aryl ethers), poly(aryl sulfones), polyamides, acetal resins, thermoplastic polyurethanes, halogenated thermoplastics and nitrile barrier resins.

10. The structural laminate of claim 9 wherein said engineering thermoplastic resin is a thermoplastic polyester.

11. The structural laminate of claim 10 wherein said thermoplastic polyester has the generalized formula:

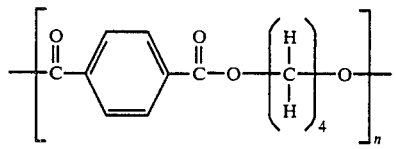

where n varies from 70 to 140.

12. The structural laminate of claim 10 wherein said polymeric resinous material consists essentially of said admixture of a block copolymer and a single engineering thermoplastic resin and wherein said thermoplastic polyester is poly(butylene terephthalate).

13. The laminate according to claim 1 wherein said block copolymer monoalkenyl arene is styrene and said block copolymer conjugated diene is selected from isoprene and butadiene.

14. The laminate according to claim 13 wherein said block copolymer has an ABA linear structure.

15. The laminate according to claim 13 wherein said block copolymer has a branched structure.

16. The laminate according to claim 10 wherein said block copolymer is a selectively hydrogenated block copolymer of styrene and butadiene, said butadiene having a 1,2 content of between about 35 and 55%.

17. The laminate according to claim 9 wherein said polymeric resinous material consists essentially of said admixture of a block copolymer and a single engineering thermoplastic resin and wherein said engineering thermoplastic resin is a polyamide.

18. The laminate according to claim 7 wherein said steel metal skin is black plate.

19. The laminate according to claim 7 wherein said steel metal skin is a zinc-coated steel.

20. The laminate of claim 1 wherein the admixture comprises about 7 to about 93 parts by weight of said elastomeric block copolymer and about 93 to about 7 parts by weight of said engineering thermoplastic resin.

21. The laminate of claim 1 wherein said block copolymer has a non-Newtonian viscosity.

* * * * *